(12) United States Patent
Barrows et al.

(10) Patent No.: US 10,748,093 B2
(45) Date of Patent: Aug. 18, 2020

(54) CARD VIEW INTERFACE WITH AUTOMATICALLY GENERATED CALCULATED VALUE

(71) Applicant: Smartsheet Inc., Bellevue, WA (US)

(72) Inventors: Christopher James Barrows, Kirkland, WA (US); Jonathan Sandler, Renton, WA (US)

(73) Assignee: Smartsheet Inc., Bellevue, WA (US)

( * ) Notice: Subject to any disclaimer, the term of this patent is extended or adjusted under 35 U.S.C. 154(b) by 0 days.

(21) Appl. No.: 16/141,837

(22) Filed: Sep. 25, 2018

(65) Prior Publication Data

US 2020/0097871 A1    Mar. 26, 2020

(51) Int. Cl.
*G06Q 10/06* (2012.01)

(52) U.S. Cl.
CPC .............................. *G06Q 10/06311* (2013.01)

(58) Field of Classification Search
CPC ....................................................... G06F 17/00
See application file for complete search history.

(56) References Cited

U.S. PATENT DOCUMENTS

| 7,143,339 B2 * | 11/2006 | Weinberg et al. ....... G06F 17/00 |
| 2017/0124055 A1 * | 5/2017 | Radakovitz et al. ........................ G06F 17/246 |
| 2018/0349338 A1 * | 12/2018 | Cheung et al. ......... G06F 17/24 |

* cited by examiner

*Primary Examiner* — James J Debrow
(74) *Attorney, Agent, or Firm* — Christensen O'Connor Johnson Kindness PLLC

(57) ABSTRACT

Embodiments of the present disclosure present a calculated value within a card view presentation in order to overcome technical problems in presenting useful card view presentations on mobile computing devices. In some embodiments, the calculated value is a summary, analysis, or other type of information generated based on data associated with cards that are in a given lane. In some embodiments, further technical problems relating to the limitations of the interface of the mobile computing device in adjusting calculated view settings are addressed by presenting a simplified configuration interface. The simplified configuration interface presents a mobile-friendly view of limited configuration settings to allow the user to easily change settings relevant to the calculated value and/or the card view, and thereby adjust the card view despite the limitations of the interface of the mobile computing device.

20 Claims, 14 Drawing Sheets

|   | NAME | TITLE | ROLE | ASSIGNED TASKS |
|---|------|-------|------|----------------|
| 1 | DAVID | EMPLOYEE | LEGAL | 4 |
| 2 | CLAIRE | EMPLOYEE | LEGAL | 7 |
| 3 | CHRIS | OWNER | INVENTOR | 2 |
| 4 | JON | EMPLOYEE | INVENTOR | 5 |
| 5 | JOLENE | OWNER | CORPORATE | 3 |
| 6 | KARA | EMPLOYEE | CORPORATE | 8 |
| 7 | MARK | OWNER | CORPORATE | 12 |
| 8 | BRUCE | EMPLOYEE | INVENTOR | 1 |

CARD VIEW INTERFACE WITH AUTOMATICALLY GENERATED CALCULATED VALUE

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method of displaying, by a mobile computing device, compact summaries of data within a table is provided. The table includes a plurality of rows and a plurality of columns, and the plurality of columns includes a first column and a second column. An overall set of cards and a set of lanes representing the data are determined. Each card represents a row of data within the table, and each lane represents a set of rows having a given value stored in the first column. A first subset of cards of the overall set of cards associated with a first lane of the set of lanes is determined. The first subset of cards is provided for presentation by a display on the mobile computing device. A calculated value is determined for the first lane based on values in the second column for the rows represented by the first subset of cards. The calculated value is provided for presentation by the display on the mobile computing device.

In some embodiments, a computer-readable medium having computer-executable instructions stored thereon is provided. The instructions, in response to execution by one or more processors of a computing device, cause the computing device to perform actions for displaying, by a mobile computing device, compact summaries of data within a table, wherein the table includes a plurality of rows and a plurality of columns, and wherein the plurality of columns includes a first column and a second column, the actions comprising: determining an overall set of cards and a set of lanes representing the data, wherein each card represents a row of data within the table, and wherein each lane represents a set of rows having a first value stored in the first column; determining a first subset of cards of the overall set of cards associated with a first lane of the set of lanes; providing the first subset of cards for presentation by a display on the mobile computing device; determining a calculated value for the first lane based on values in the second column for the rows represented by the first subset of cards; and providing the calculated value for presentation by the display on the mobile computing device.

In some embodiments, a system comprising one or more computing devices for causing a mobile computing device to display compact summaries of data within a table is provided. The table includes a plurality of rows and a plurality of columns, and the plurality of columns includes a first column and a second column. The one or more computing devices are configured to: determine an overall set of cards and a set of lanes representing the data, wherein each card represents a row of data within the table, and wherein each lane represents a set of rows having a first value stored in the first column; determine a first subset of cards of the overall set of cards associated with a first lane of the set of lanes; provide the first subset of cards for presentation by a display on the mobile computing device; determine a calculated value for the first lane based on values in the second column for the rows represented by the first subset of cards; and provide the calculated value for presentation by the display on the mobile computing device.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figures 1, 2:
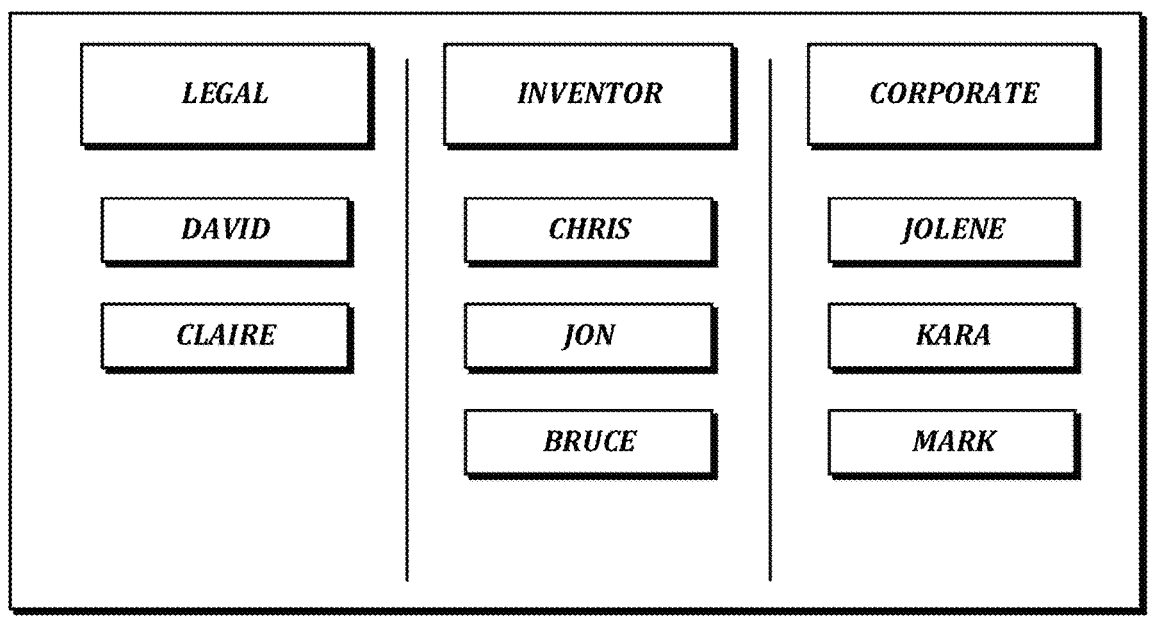
FIG. 1 illustrates an example of tabular data that may be stored in a tabular data system.
FIG. 2 illustrates an example of a card view display of the tabular data shown in FIG. 1.

Tabular data systems can be used to organize and manipulate data. FIG. 1 illustrates an example of tabular data that may be stored in a tabular data system. As shown, data representing individuals, their titles, their roles within an organization, and the number of tasks assigned to each of the individuals is organized into a table. The table has a set of columns, each of which is associated with a column name. As shown, the table includes columns named "Name," "Title," "Role," and "Assigned Tasks." The table also includes a set of rows, each of which has been numbered for the ease of discussion. The intersection of a row and a column may be referred to as a cell.

In some embodiments, the numbering of each row may represent a unique identifier that can be used to uniquely reference each row. As illustrated, each row in the table is associated with an individual, and each column stores a type of data for the individual. For example, row 1 includes a value of "David" in the "Name" column, a value of "Employee" in the "Title" column, a value of "Legal" in the "Role" column, and a value of "4" in the "Assigned Tasks" column. Of course, the tabular data illustrated in FIG. 1 is an example only, and in other examples, more, fewer or different rows and/or columns may be present. In some embodiments, some cells may include static numerical or text values, while values in some cells may be calculated based on values in other cells.

In some embodiments of tabular data systems, the tabular data may be displayed in a table format similar to that shown in FIG. 1, or may be reorganized into another format that allows a more concise depiction of the data stored therein. Charts and graphs are some examples of concise depictions of data stored within tabular data systems, though charts and graphs are not always convenient for navigating the stored data. An improved format for summarizing tabular data for navigation is known as a "card view" format. In a card view, each row of the tabular data is presented as a "card," which displays a representative portion of the data stored in the row. The cards may then be further organized into "lanes" based on another portion of the data stored in each row. In some embodiments, one column is chosen to define the lanes. To do so, one lane is created for each value stored in the column. The cards are then sorted into the lanes based on which value is stored in the column for the row associated with the card. In some embodiments, another column may be chosen to indicate the representative portion of data stored in the row.

FIG. 2 illustrates an example of a card view display of the tabular data shown in FIG. 1. In the card view shown in FIG. 2, the "role" column was chosen to define the lanes. As such, because the "role" column includes the values "Legal," "Inventor," and "Corporate," three lanes are created, one each to correspond to each of the values stored in the "role" column." A first lane 202 illustrates the cards for rows that include the value "Legal" in the "role" column, a second lane 204 illustrates the cards for rows that include the value "Inventor" in the "role" column, and a third lane 206 illustrates the cards for rows that include the value "Corporate" in the "role" column. Each lane is identified with a header that displays the value associated with the lane. Further, the "name" column was chosen to indicate the representative portion of data. Accordingly, each of the cards displays the value from the "name" column in the associated row. For example, row 3 of the table illustrated in FIG. 1 includes the value "Chris" in the "name" column, the value "Inventor" in the "role" column, and the value "2" in the "assigned tasks" column. As such, the card for row 3 displays the value "Chris" due to the value in the "name" column, and is organized into the second lane 204 due to the value in the "role" column. In some embodiments, clicking on, tapping, or otherwise interacting with a card in the card view causes further information from the associated row to be displayed.

The illustration of three lanes is an example only. In some embodiments, the number of lanes may be determined by the number of distinct values stored in the column chosen to define the lanes. For example, if the "title" column were to be chosen to define the lanes, the cards would be organized into two lanes instead of three lanes, because there are two distinct values ("employee" and "owner") in the "title" column. In some embodiments, the values stored in the column chosen to define the lanes may be editable via a drop-down list, a picker, or another suitable interface element when editing the values in the tabular data.

Figure 3:
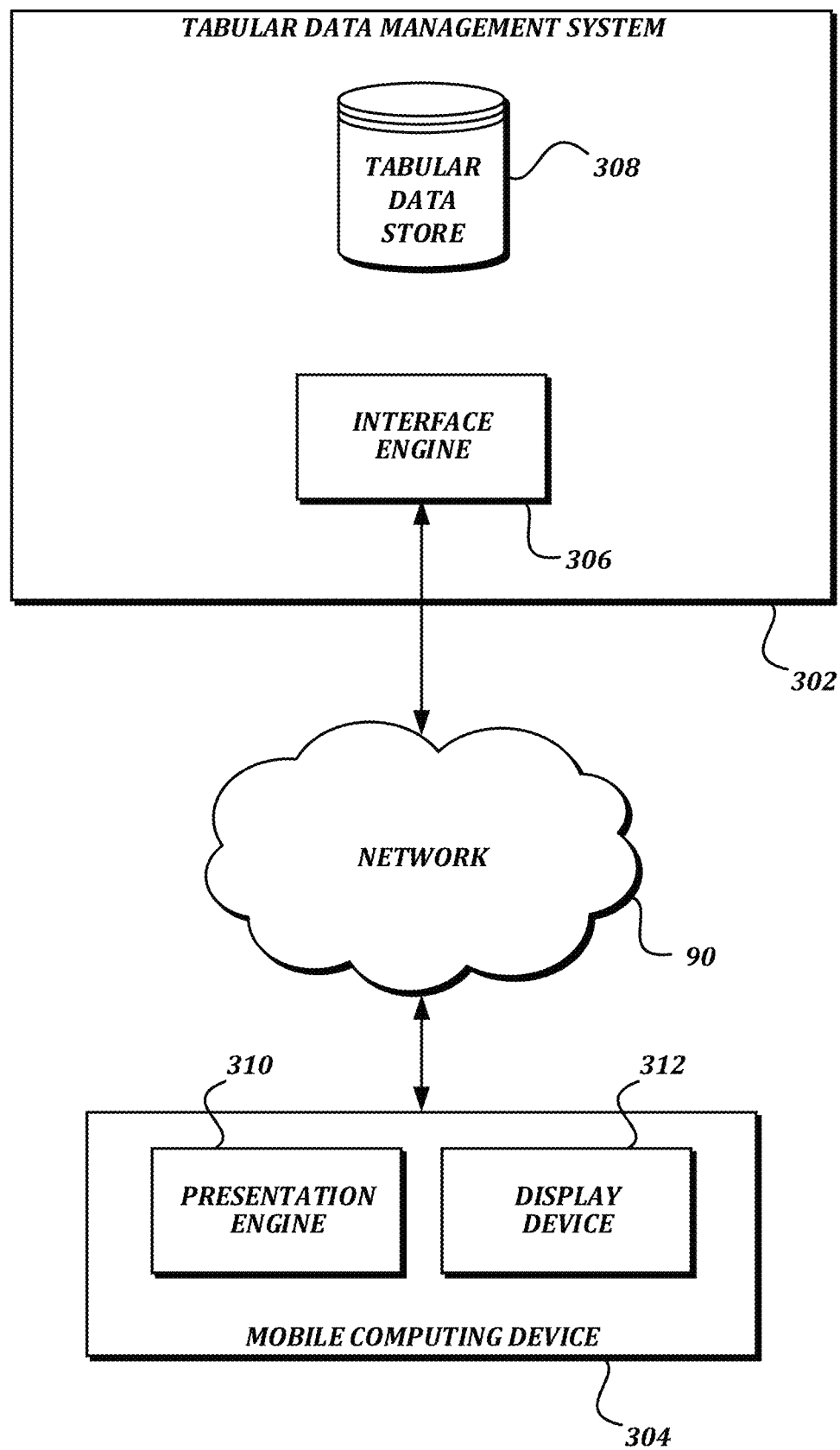
FIG. 3 is a schematic diagram that illustrates an example embodiment of a system for manipulating tabular data according to various aspects of the present disclosure.
Figure 4A:
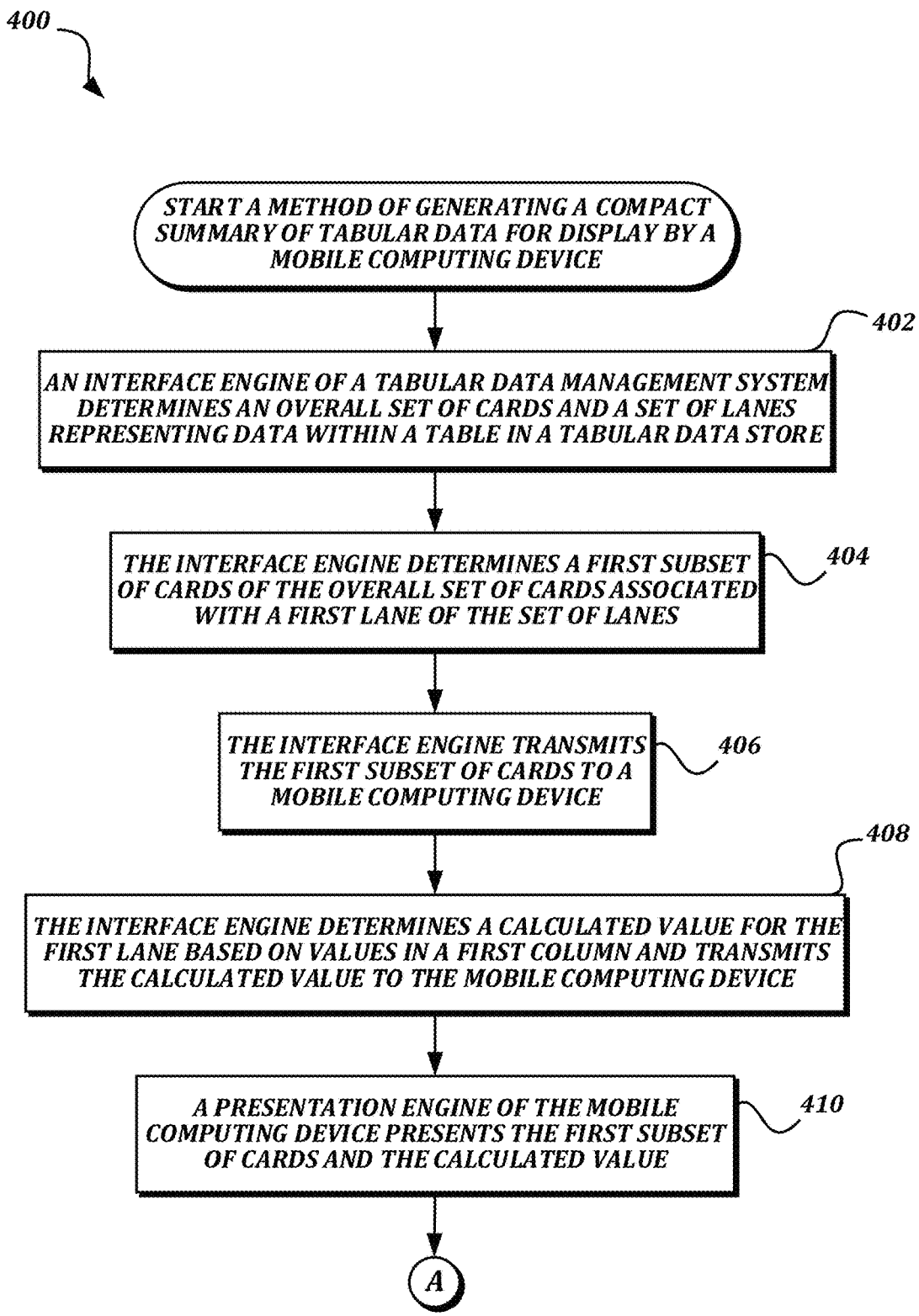
FIGS. 4A-4E are a flowchart that illustrates an example embodiment of a method of generating a compact summary of tabular data for display by a mobile computing device according to various aspects of the present disclosure.
Figure 4B:
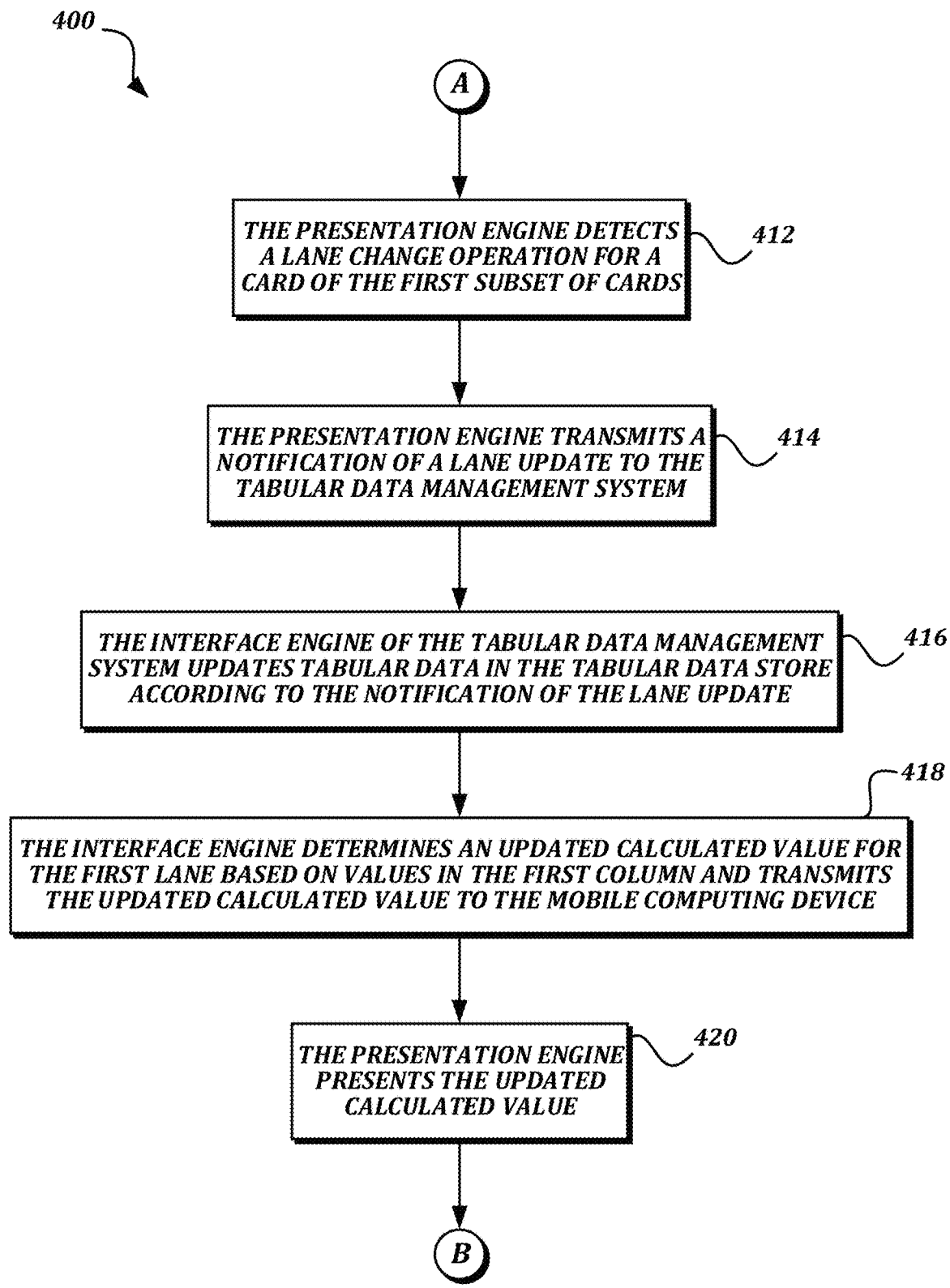
Figure 4C:
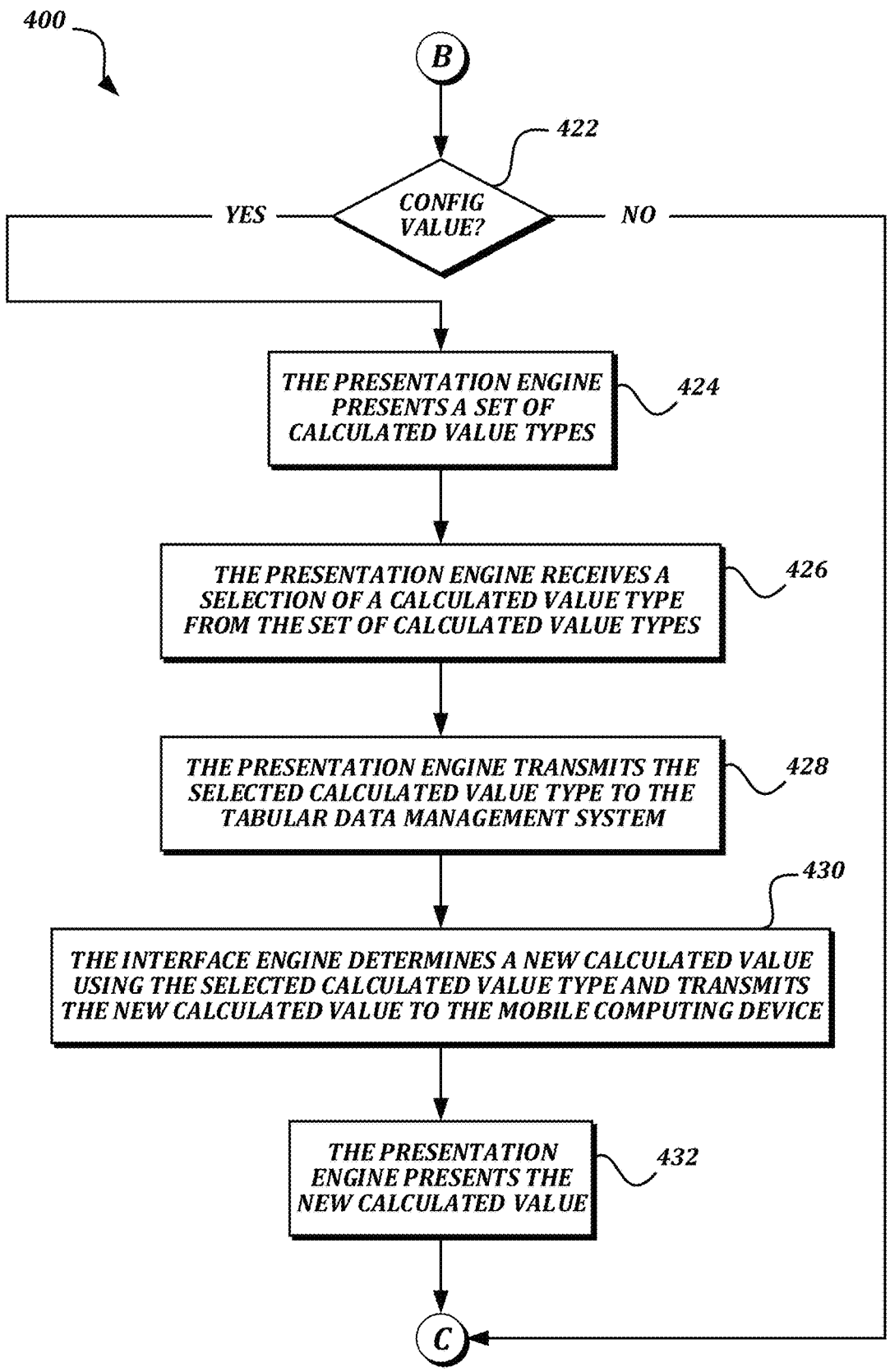
Figure 4D:
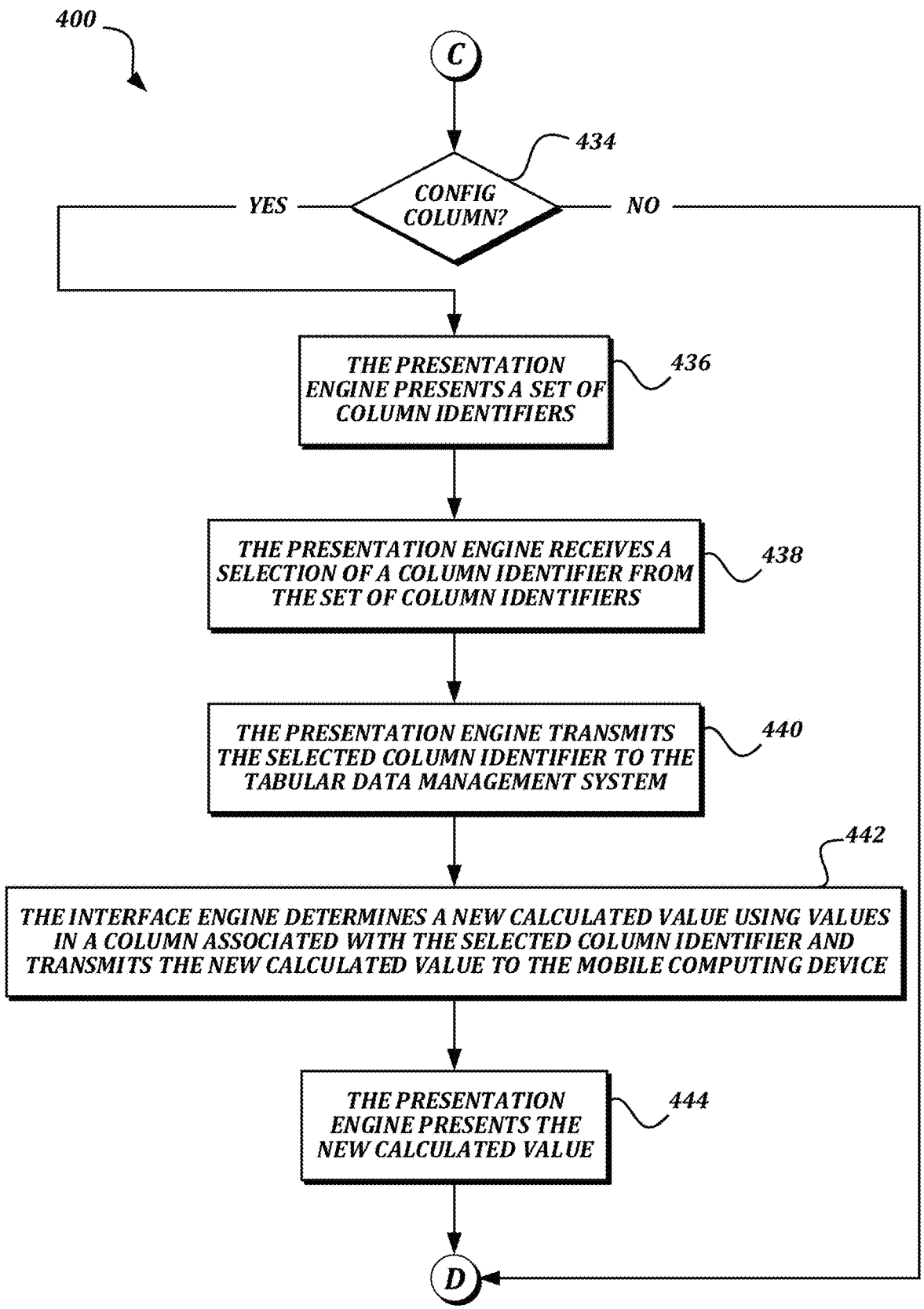
Figure 4E:
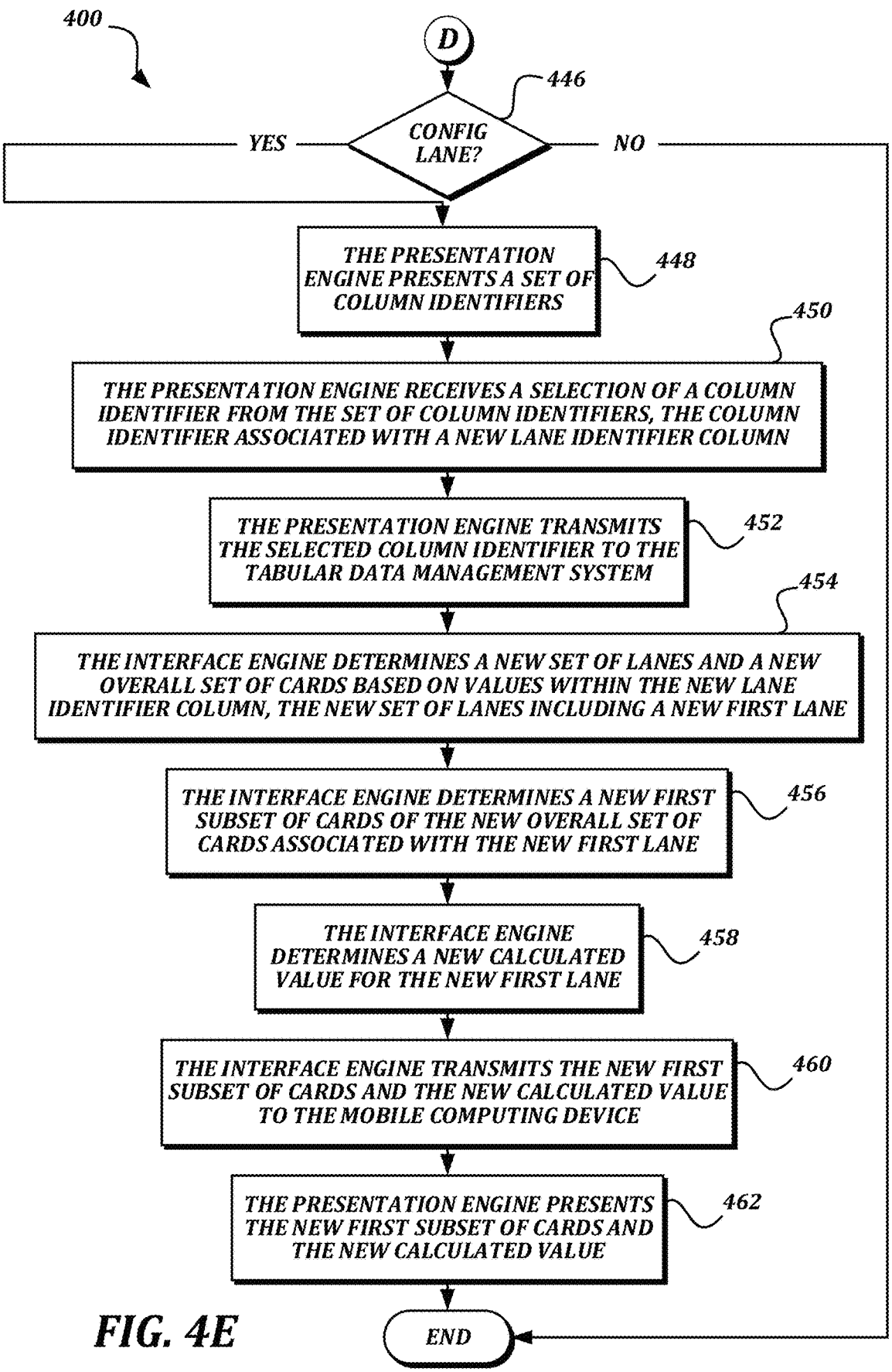

FIG. 3 is a schematic diagram that illustrates an example embodiment of a system for manipulating tabular data according to various aspects of the present disclosure. As illustrated, the environment includes a tabular data management system 302 and a mobile computing device 304.

The tabular data management system 302 includes one or more computing devices configured to provide shared services for storing and manipulating tabular data. As shown, the one or more computing devices of the tabular data management system 302 are configured to provide a tabular data store 308 and an interface engine 306. In some embodiments, the tabular data store 308 is configured to store tabular data and provide access to said data for other components of the tabular data management system 302. As understood by one of ordinary skill in the art, a "data store" as described herein may be any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner, such as files in a file system, on a computer-readable storage medium, as described further below. One of ordinary skill in the art will recognize that separate data stores described herein may be combined into a single data store, and/or a single data store described herein may be separated into multiple data stores, without departing from the scope of the present disclosure.

In some embodiments, the interface engine 306 is configured to provide one or more interfaces through which a user of the mobile computing device 304 can access tabular data stored by the tabular data management system 302. One example of an interface that may be provided by the interface engine 306 is a web-based interface accessible via a web browser that allows a user to access and manipulate the tabular data. Another example of an interface that may be provided by the interface engine 306 is an application programming interface (API) that allows programmatic access to the tabular data. The API may be coupled with a user interface provided by an application or engine executing on the mobile computing device 304 (such as the presentation engine 310) in order to provide access to the tabular data. In some embodiments, a combination of functionality executing on the server and functionality executing on the mobile computing device 304 may be used to provide the interface.

In general, the word "engine" as used herein refers to logic embodied in hardware or software instructions, which can be written in a programming language, such as C, C++, COBOL, JAVA™, PHP, Perl, HTML, CSS, JavaScript, VBScript, ASPX, Microsoft .NET™, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine.

The mobile computing device 304 may be any type of computing device that is portable and capable of wireless communication with the network 90. A typical example of a mobile computing device 304 is a smartphone such as an Apple iPhone device, a Samsung Galaxy Note device, a Samsung Galaxy S device, or a Google Pixel device. Other examples of mobile computing devices 304 may include tablet computing devices such as an Apple iPad.

As illustrated, the mobile computing device 304 includes a presentation engine 310 and a display device 312. In some embodiments, the presentation engine 310 generates presentations of tabular data in coordination with the interface engine 306, and receives input from a user to manipulate the tabular data. The presentations are typically presented using the display device 312. In some embodiments, the display device 312 is a screen such as an OLED device, an AMO-LED device, or other suitable device. In some embodiments, the display device 312 is also touch sensitive, such that a user can interact with information presented on the display device 312 using touches such as tapping, holding, swiping, and dragging. In some embodiments, the mobile computing device 304 also includes one or more other components of a computing device 900 as discussed further below.

As illustrated, the tabular data management system 302 and the mobile computing device 304 communicate via a network 90. The network 90 may include any type of wired or wireless communication technology or combinations thereof, including but not limited to Ethernet, Wi-Fi, WiMAX, Bluetooth, USB, 3G, 4G, LTE, and the Internet. In some embodiments, the network 90 may include multiple types of wired or wireless communication technology. As a non-limiting example, the mobile computing device 304 may connect to a wireless network access point using Wi-Fi, 3G, 4G, or LTE. The wireless network access point may be coupled to the Internet via Ethernet or other wired communication technology in order to communicate with the tabular data management system 302 (which may also be coupled to the Internet via Ethernet or other wired communication technology).

Though illustrated as including a single tabular data management system 302 and a single mobile computing device 304, in some embodiments, the environment may also include other devices that can communicate with tabular data management system 302, including but not limited to one or more desktop computing devices, one or more other data stores, and more than one mobile computing device 304.

The use of separate devices and distribution of tasks between the tabular data management system 302 and the mobile computing device 304 provides certain benefits, including but not limited to the ability to share the data storage and management functions of the tabular data management system 302 amongst multiple mobile computing devices 304. However, the separation of tasks as described above is an example only. In some embodiments, the entirety of the processing described above may be performed by the mobile computing device 304, such that the tasks associated with the interface engine 306 and the presentation engine 310 are all performed by the mobile computing device 304, and the tabular data management system 302 may merely provide the tabular data store 308 for persistent storage. In some embodiments, the mobile computing device 304 may include both the tabular data store 308 and the interface engine 306, in which case the tabular data management system 302 may be omitted.

Though card view presentations of tabular data are useful, problems exist when attempting to present and configure such views on mobile computing devices 304. As one example of a technical problem, the card view presentation makes it easy to quickly review single values in a lane, and to move cards between lanes (and thereby changing the underlying data), but no other summary or analysis of the data within a given lane is presented. By failing to analyze or summarize the data within a given lane, much of the power of traditional tabular data manipulation techniques is unused. As another example of a technical problem imposed by the use of mobile computing devices 304, the usable area of the display device 312 is limited. For example, the Apple iPhone 8 Plus has a 5.5 inch screen, measured along the diagonal. Apple recommends that a minimum usable size for an interactive interface control is about 44 pt×44 pt. 1 pt is equal to 1/72nd of an inch, which means the minimum size for an interactive interface control is about ⅝ths of an inch square. Accordingly, there is a limited amount of display real estate for both displaying information and for presenting interfaces for configuring the display of information. Further, the interface of a mobile computing device 304 is generally limited to tapping, dragging, pinching, and other touch-related gestures. Though screen keyboard input is possible, such input can be tedious and error-prone. Accordingly, detailed manipulation of application settings is difficult with these limited interaction options, so even if a card view interface were to be augmented with summary or other data analysis information, it is a significant technical challenge to be able to use a mobile computing device 304 to configure a card view interface to present and summarize tabular data in a useful way.

To solve the technical problems described above relating to the lack of data analysis presentation in a card view, embodiments of the present disclosure present a calculated value within a card view presentation. In some embodiments, the calculated value is a summary, analysis, or other type of information generated based on data associated with cards that are in a given lane. In some embodiments, the calculated value may be determined using a particular type of operation, including but not limited to a sum, a mean, a median, a maximum, and a minimum, performed over a particular column of tabular data. In some embodiments, the further technical problems relating to the limitations of the interface of the mobile computing device 304 to adjust calculated view settings are addressed by presenting a simplified configuration interface. The simplified configuration interface presents a mobile-friendly view of limited configuration settings to allow the user to easily change settings relevant to the calculated value and/or the card view, and thereby adjust the card view despite the limitations of the interface of the mobile computing device 304.

FIGS. 4A-4E are a flowchart that illustrates an example embodiment of a method of generating a compact summary of tabular data for display by a mobile computing device according to various aspects of the present disclosure that helps address these technical problems. From a start block, the method 400 proceeds to block 402, where an interface engine 306 of a tabular data management system 302 determines an overall set of cards and a set of lanes representing data within a table in a tabular data store 308. As discussed above with respect to FIGS. 1 and 2, each card of the overall set of cards may represent a row of data within the table, and the set of lanes may be determined based on values stored in a first column of the table.

Next, at block 404, the interface engine 306 determines a first subset of cards of the overall set of cards associated with a first lane of the set of lanes. The first lane may be associated with a first value stored in the first column, and the first subset of cards are chosen based on cards that are associated with rows having the first value stored in the first column. For example, in FIGS. 1 and 2, the value "Legal"

is associated with the first lane 202. The cards that are determined to be associated with the first lane 202 are those cards that are associated with row 1 and row 2 of the table in FIG. 1 because they include the value "Legal" in the "role" column. At block 406, the interface engine 306 transmits the first subset of cards to a mobile computing device 304. In some embodiments, the interface engine 306 may transmit all of the information for the rows that make up the first subset of cards. In some embodiments, the interface engine 306 may provide further technical benefits by limiting the amount of information from each row sent to the information needed for presenting the cards and identifying the associated rows, such as the value from the column used to indicate the representative portion of the data stored in the row, and a unique identifier of the row, in order to reduce the amount of bandwidth consumed in the transmissions between the tabular data management system 302 and the mobile computing device 304.

At block 408, the interface engine 306 determines a calculated value for the first lane based on values in a first column and transmits the calculated value to the mobile computing device 304. In some embodiments, the type of operation and the column to be processed are stored along with the tabular data.

Figure 5:
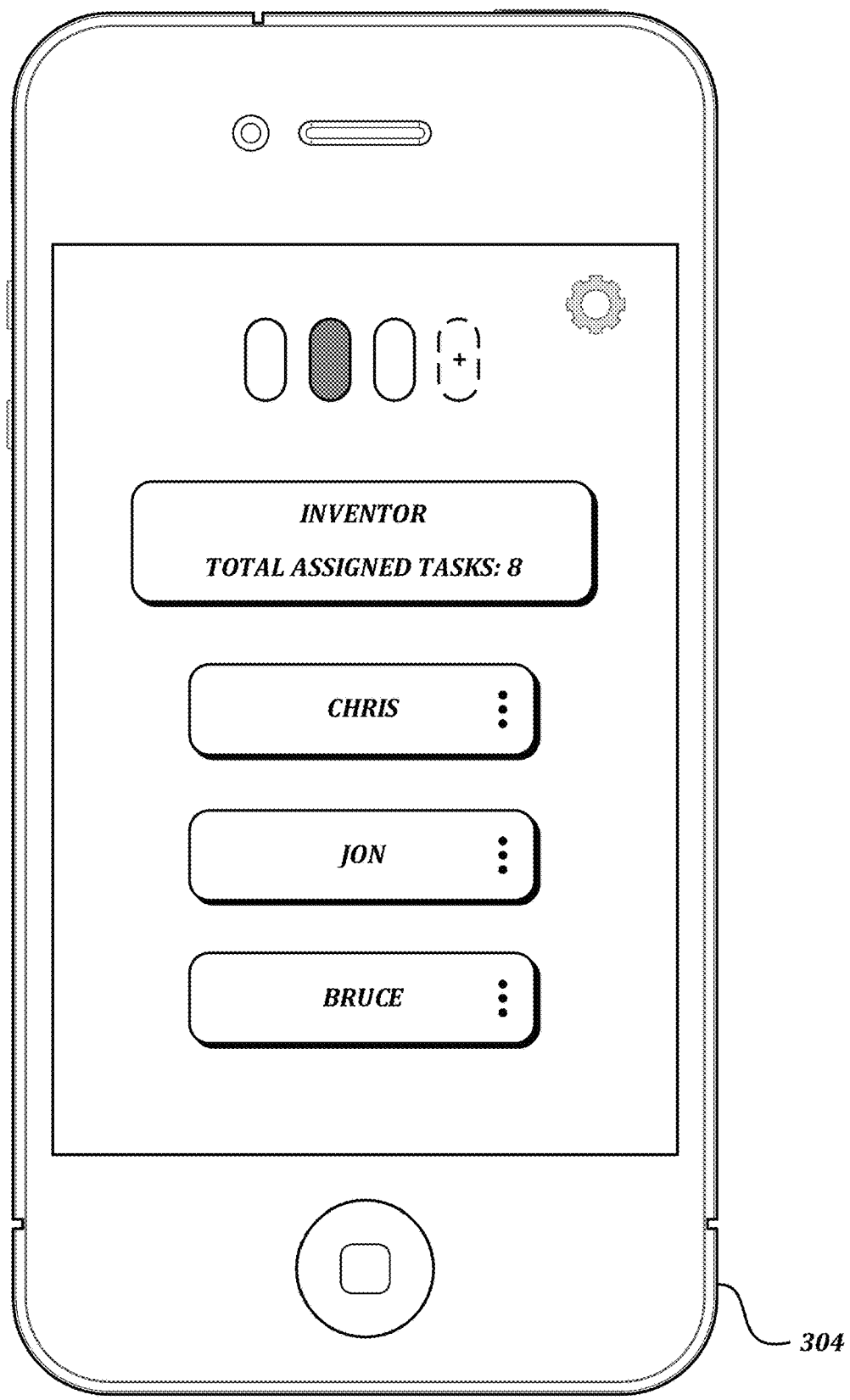
FIG. 5 illustrates an example embodiment of a presentation generated by a mobile computing device of a first subset of cards and a calculated value according to various aspects of the present disclosure.

At block 410, a presentation engine 310 of the mobile computing device 304 presents the first subset of cards and the calculated value. FIG. 5 illustrates an example embodiment of a presentation generated by a mobile computing device of the first subset of cards and the calculated value according to various aspects of the present disclosure. As shown, the display device 312 of the mobile computing device 304 presents a card view interface based on the tabular data of FIG. 1, with the "role" column defining the lanes. A set of lane indicators is presented at the top of the card view interface, showing that the second lane (associated with the value "inventor') is currently being displayed. Tapping, clicking, or otherwise actuating the lane indicators of the set of lane indicators may cause the card view interface to present cards of a different lane. A gear icon is presented in the upper right of the card view interface. Tapping, clicking, or otherwise actuating the gear icon may cause a settings dialog to be presented, which is described further below. A header card is presented which includes the value associated with the presented lane ("inventor"). The header card also includes an indication of the type of calculated value ("total"), the column from which the calculated value is determined ("assigned tasks"), and the calculated value itself ("8"). In this example, the calculated value is the sum of the values in the "assigned tasks" column for the rows/cards that are in the "inventor" lane.

Returning to FIG. 4A, the method 400 proceeds to a continuation terminal ("terminal A"). From terminal A (FIG. 4B), the method 400 proceeds to block 412, where the presentation engine 310 detects a lane change operation for a card of the first subset of cards. The lane change operation is an interaction in the interface which causes the card to be moved from its current lane to a new lane. One example of a lane change operation is a drag-and-drop of a card onto a lane identifier, such as described in commonly owned, co-pending U.S. application Ser. No. 16/141,465, filed Sep. 25, 2018, the entire disclosure of which is hereby incorporated by reference herein in its entirety. Other examples of lane change operations may include tapping a card and then tapping a lane indicator, tapping a card and then choosing a lane from a picker control, or any other suitable operation.

At block 414, the presentation engine 310 transmits a notification of a lane update to the tabular data management system 302. Logically, the lane update causes the card to be moved from its current lane to the new lane. The notification of the lane update may include an identifier usable to identify the card (and/or its underlying data) and an identifier usable to identify the lane associated with the new lane (such as an identifier of the lane, the value associated with the lane, or an identifier of the lane indicator).

At block 416, the interface engine 306 of the tabular data management system 302 updates tabular data in the tabular data store 308 according to the notification of the lane update. In some embodiments, the interface engine 306 may determine a row associated with the card, and may then change the value in the column used to determine the lane to the value associated with the new lane.

At block 418, the interface engine 306 determines an updated calculated value for the first lane based on values in the first column and transmits the updated calculated value to the mobile computing device 304. These actions are similar to the actions in block 408 above, though the rows included in the first lane (and used to determine the updated calculated value) will now be missing the row associated with the moved card, so the calculated value will likely be different. At block 420, the presentation engine 310 presents the updated calculated value.

Figure 6A:
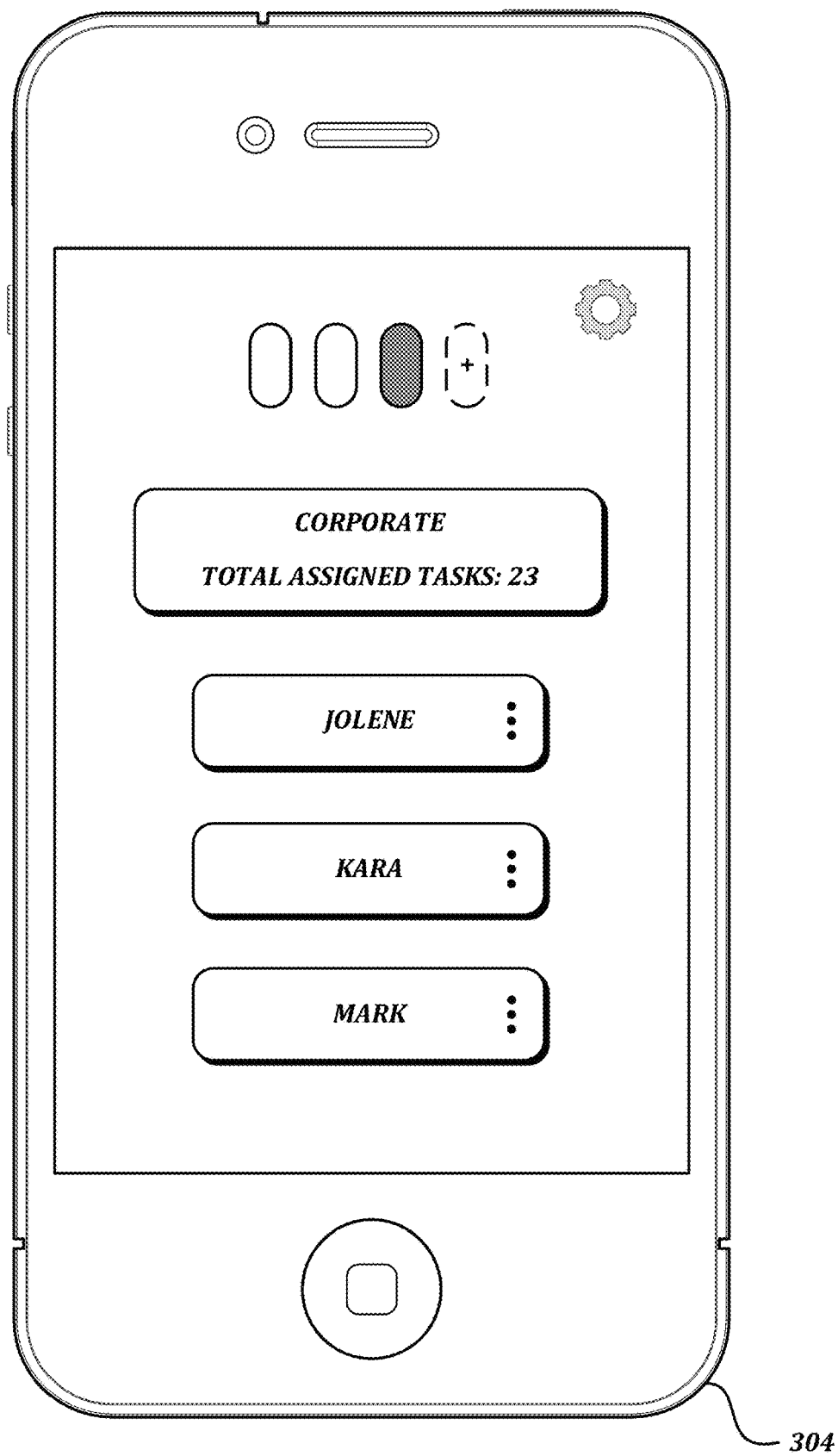
FIGS. 6A and 6B illustrate an example embodiment of an interface presented by a mobile computing device before and after a lane change operation according to various aspects of the present disclosure.
Figure 6B:
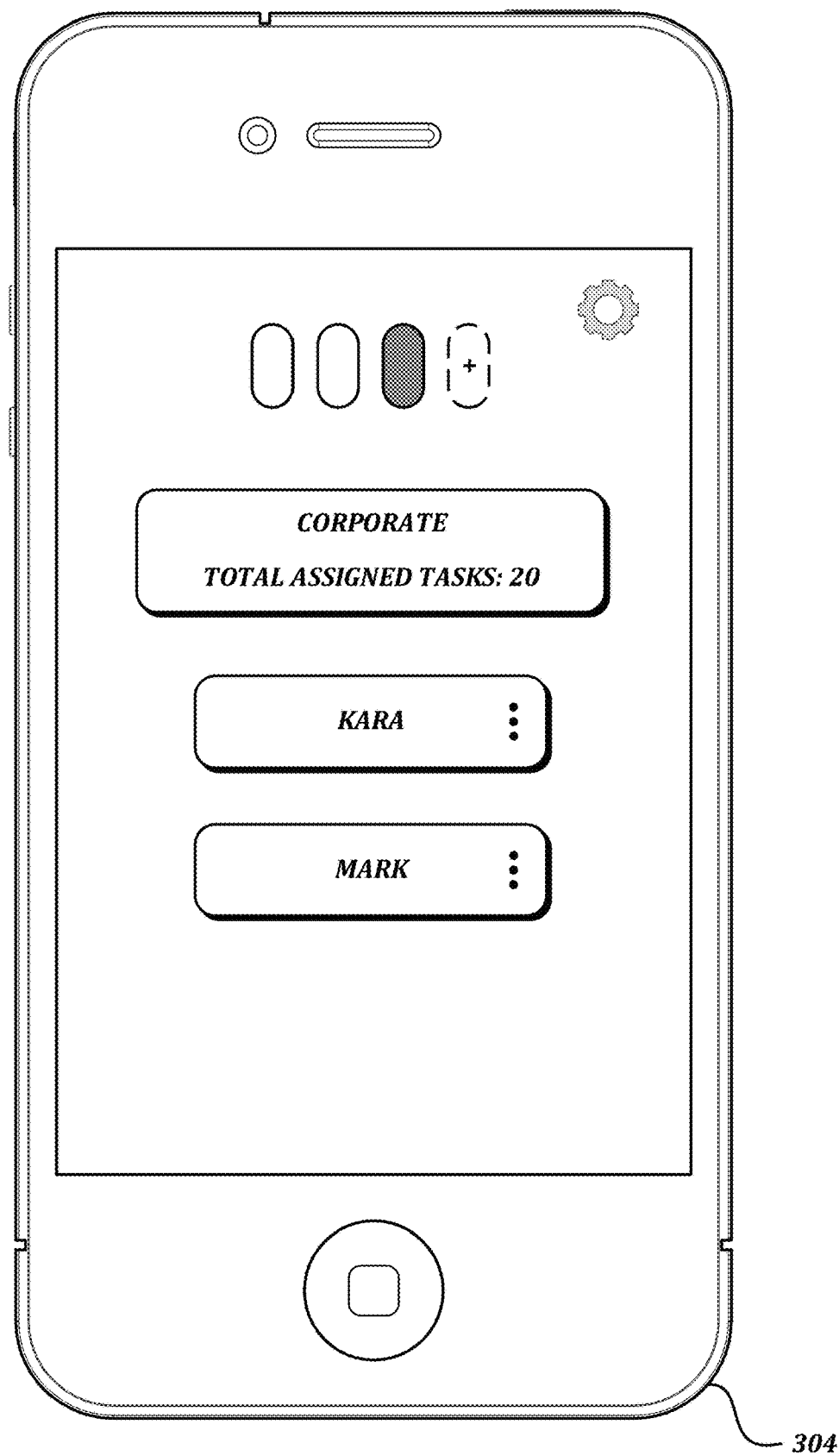

FIGS. 6A and 6B illustrate an example embodiment of an interface presented by a mobile computing device 304 before and after a lane change operation according to various aspects of the present disclosure. As with FIG. 5, the interface illustrated in FIG. 6A reflects the tabular data illustrated in FIG. 1. The header card in FIG. 6A shows that, for the three cards/rows in the "corporate" lane, the total of the values in the "assigned tasks" column is "23." FIG. 6B illustrates the interface after the "Jolene" card has been moved to a different lane, as described in blocks 412-420. Because the row associated with the "Jolene" card, row 5, had a value of "3" in the "assigned tasks" column, the updated calculated value illustrated in FIG. 6B is "20" instead of "23."

Returning to FIG. 4B, the method 400 then proceeds to a continuation terminal ("terminal B"). In some embodiments, the method 400 may terminate at this point, or may loop back to present other lanes and calculated values, or to update calculated values as the result of lane change operations. In some embodiments, the method 400 may proceed further. The remainder of the illustrated method 400 performs various configurations of the calculated values and lanes, despite the technical limitations of the display device 312 of the mobile computing device 304.

From terminal B (FIG. 4C), the method 400 proceeds to a decision block 422, where a determination is made regarding whether the method 400 will configure the type of the calculated value. This determination may typically be based on a user selection of a "settings" interface element, such as the gear illustrated in the upper right of FIGS. 5, 6A, and 6B. If the method 400 will not be configuring the type of the calculated value, then the result of decision block 422 is NO, and the method 400 proceeds to a continuation terminal ("terminal C"). Otherwise, if the method 400 will configure the settings used to generate the calculated value, then the result of decision block 422 is YES, and the method 400 proceeds to block 424.

At block 424, the presentation engine 310 presents a set of calculated value types. The set of calculated value types may include any type of calculated value supported by the tabular data management system 302, including but not limited to a sum calculated value type (which calculates the sum of the values in the indicated column for rows associated with cards in the lane), a mean calculated value type (which calculates the mean of the values in the indicated column for rows associated with cards in the lane), a median calculated value type (which calculates the median of the values in the indicated column for rows associated with cards in the lane), a max calculated value type (which determines a maximum value of the values in the indicated column for rows associated with cards in the lane), and a min calculated value type (which determines a minimum value of the values in the indicated column for rows associated with cards in the lane).

Figure 7A:
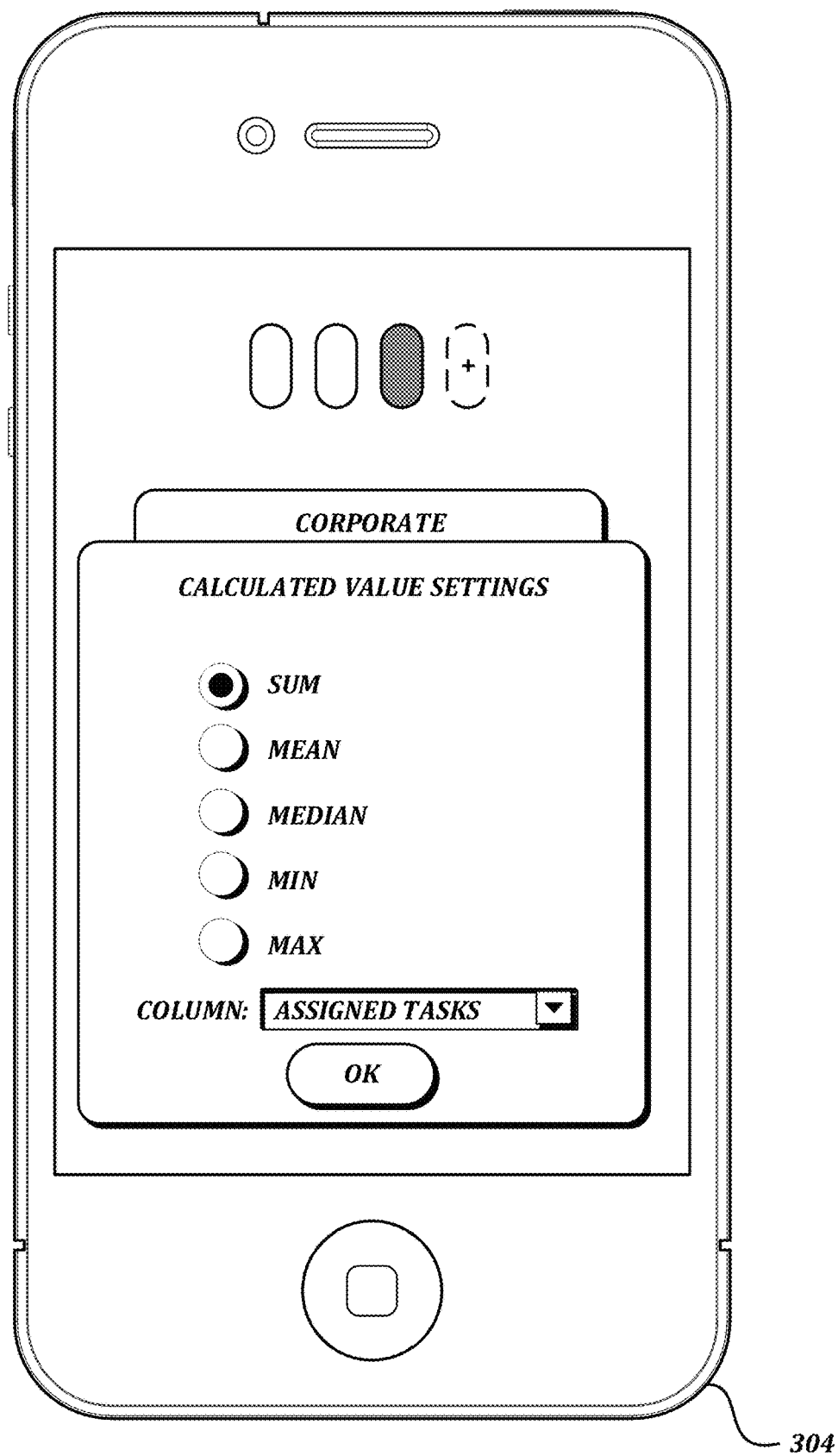
FIG. 7A illustrates an example embodiment of an interface presented by a mobile computing device that includes a presentation of a set of calculated value types and a dropdown list of column identifiers according to various aspects of the present disclosure.

FIG. 7A illustrates an example embodiment of an interface presented by a mobile computing device that includes a presentation of a set of calculated value types according to various aspects of the present disclosure. This is an example of an interface that may be presented upon actuating the gear icon shown in FIGS. 5, 6A, and 6B. As shown, the interface includes radio button elements that allow a calculated value type to be selected from the set of calculated value types.

Returning to FIG. 4C, at block 426, the presentation engine 310 receives a selection of a calculated value type from the set of calculated value types. As shown in FIG. 7A, this may include tapping, clicking, or otherwise actuating a radio button element associated with one of the calculated value types. For purposes for description of the present method 400, this will typically be a different radio button element than the currently selected radio button element, such that the selection indicates a change in calculated value type. At block 428, the presentation engine 310 transmits the selected calculated value type to the tabular data management system 302.

At block 430, the interface engine 306 determines a new calculated value using the selected calculated value type and transmits the new calculated value to the mobile computing device 304. At block 432, the presentation engine 310 presents the new calculated value. The determination and presentation of the new calculated value is similar to the determination and presentation of the calculated value in blocks 408-410 described above, but uses the new calculated value type instead of the original calculated value type. In some embodiments, the tabular data management system 302 may cache the calculated value, and/or store the selected calculated value type in association with the tabular data for use in the generation of future presentations.

Figure 7B:
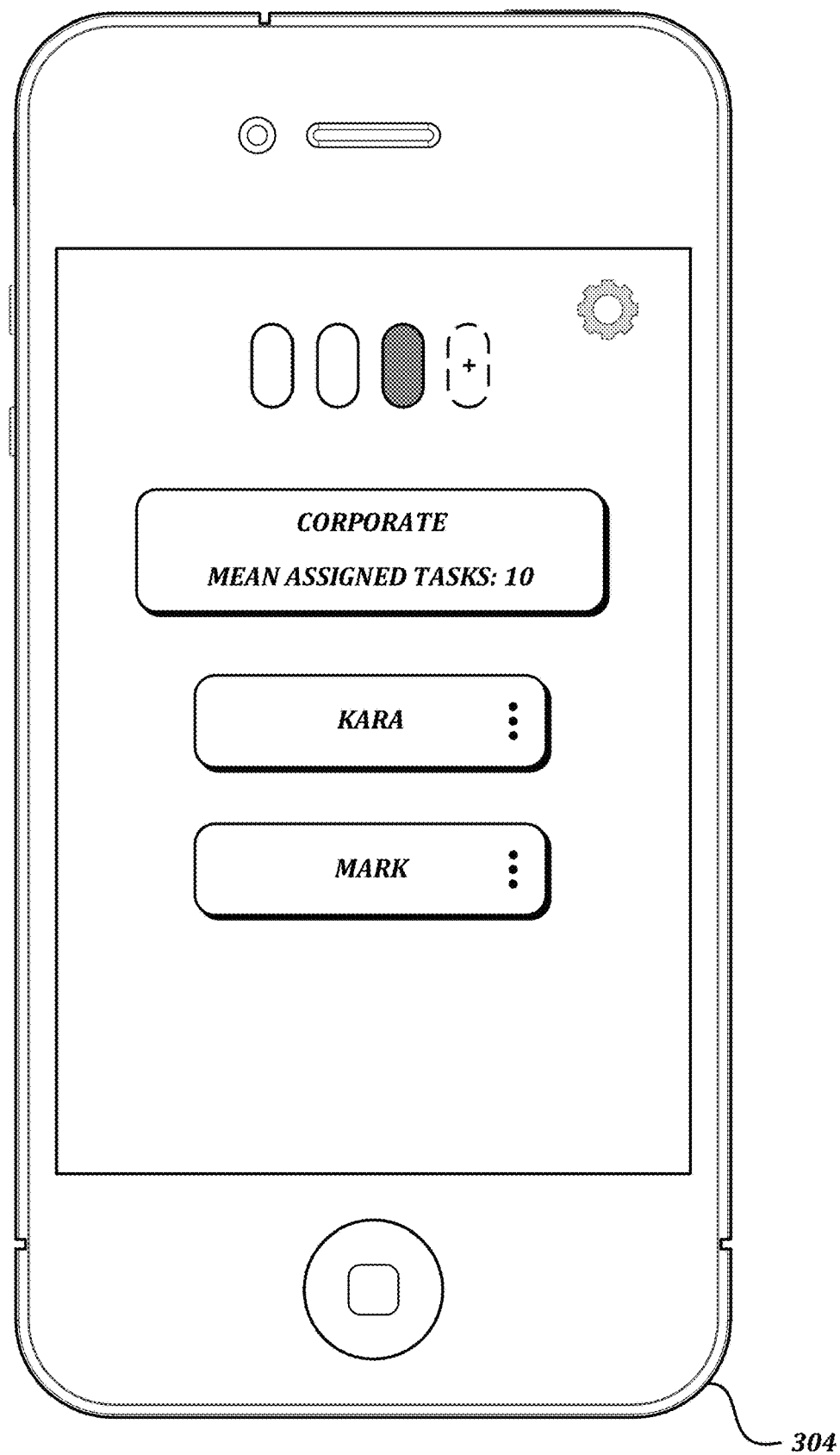
FIG. 7B illustrates an example embodiment of an interface presented by a mobile computing device after a new calculated value has been determined according to various aspects of the present disclosure.

FIG. 7B illustrates an example embodiment of an interface presented by a mobile computing device 304 after a new calculated value has been determined according to various aspects of the present disclosure. The interface shown may have originally been presenting data similar to that illustrated in FIG. 6B, but then had the calculated value type changed from "sum" to "mean" via the interface illustrated in FIG. 7A. The header card now shows that the calculated value type is "mean," and shows the new calculated value, which is the mean of the rows associated with the cards in the "corporate" lane.

Returning to FIG. 4C, the method 400 then proceeds to terminal C. From terminal C (FIG. 4D), the method 400 proceeds to a decision block H34, where a determination is made regarding whether the method 400 will configure the column used to generate the calculated value. As with decision block 422 described above, the decision may typically be based on a user actuation of a "settings" interface element. If the method 400 will not configure the column used to generate the calculated value, then the result of decision block 434 is NO, and the method 400 proceeds to a continuation terminal ("terminal D"). Otherwise, if the method 400 will configure the settings used to generate the calculated value, then the result of decision block 434 is YES, and the method 400 proceeds to block 436.

At block 436, the presentation engine 310 presents a set of column identifiers. At block 438, the presentation engine 310 receives a selection of a column identifier from the set of column identifiers, and at block 440, the presentation engine 310 transmits the selected column identifier to the tabular data management system 302. The set of column identifiers may be presented and a selection of a column identifier may be received using any suitable technique. For example, in some embodiments, a list of column identifiers may be presented next to radio buttons, and actuating a radio button selects the associated column identifier. As another example, the set of column identifiers may be presented in a dropdown list or picker control, and selecting a value from the dropdown list or picker control indicates the selection of the associated column identifier. FIG. 7A shows a presentation of a dropdown list, below the set of radio buttons. The dropdown list includes the column identifiers associated with the tabular data illustrated in FIG. 1, and selecting a new column identifier from the dropdown list causes the new column identifier to be used to determine the calculated value as described below. In some embodiments, tapping the dropdown list may cause a picker control to be presented that allows a user to select a column identifier.

Returning to FIG. 4D, at block 442, the interface engine 306 determines a new calculated value using values in a column associated with the selected column identifier and transmits the new calculated value to the mobile computing device 304. At block 444, the presentation engine 310 presents the new calculated value. The method 400 then proceeds to terminal D. Again, the determination, transmission, and presentation of the new calculated value is similar to that described above in blocks 408-410 where the initial calculated value is determined, transmitted, and presented, but uses the column associated with the selected column identifier instead of the original column identifier. Also similar to block 432, the tabular data management system 302 may cache the calculated value, and/or store the selected column identifier in association with the tabular data for use in the generation of future presentations. Though blocks 422-444 illustrate the calculated value being determined and presented separately after selecting a calculated value type and selecting a new column identifier, in some embodiments, both a new calculated value type and a new column identifier may be selected before determining, transmitting, and presenting the new calculated value.

From terminal D (FIG. 4E), the method 400 proceeds to a decision block 446, where a determination is made regarding whether the method 400 will configure the column used to determine the lanes. Again, the decision may typically be based on a user actuation of a "settings" interface element. If the method 400 will not configure the column used to determine the lanes, then the result of decision block 446 is NO, and the method 400 proceeds to an end block, where it terminates. Otherwise, if the method 400 will configure the column used to determine the lanes, then the result of decision block 446 is YES, and the method 400 proceeds to block 448.

At block 448, the presentation engine 310 presents a set of column identifiers. The presentation of the set of column identifiers may be similar to one of the presentations discussed above with respect to block 436, such as a set of radio buttons, a dropdown list, or a picker control. At block 450, the presentation engine 310 receives a selection of a column identifier from the set of column identifiers, the column identifier associated with a new lane identifier column. At block 452, the presentation engine 310 transmits the selected column identifier to the tabular data management system 302. The actions of blocks 448-452 are similar to those discussed in blocks 436-440, in that they also involve displaying, selecting, and transmitting a column identifier. Accordingly, the details not repeated here for the sake of brevity.

At block 454, the interface engine 306 determines a new set of lanes and a new overall set of cards based on values within the new lane identifier column, the new set of lanes including a new first lane. At block 456, the interface engine 306 determines a new first subset of cards of the new overall set of cards associated with the new first lane. At block 458, the interface engine 306 determines a new calculated value for the new first lane. At block 460, the interface engine 306 transmits the new first subset of cards and the new calculated value to the mobile computing device 304, and at block 462, the presentation engine 310 presents the new first subset of cards and the new calculated value. The actions of blocks 454-462 are similar to the actions described in blocks 402-410, but using the newly selected column instead of the original column used to determine the lanes. Accordingly, repetition of these details is omitted for the sake of brevity.

Figure 8:
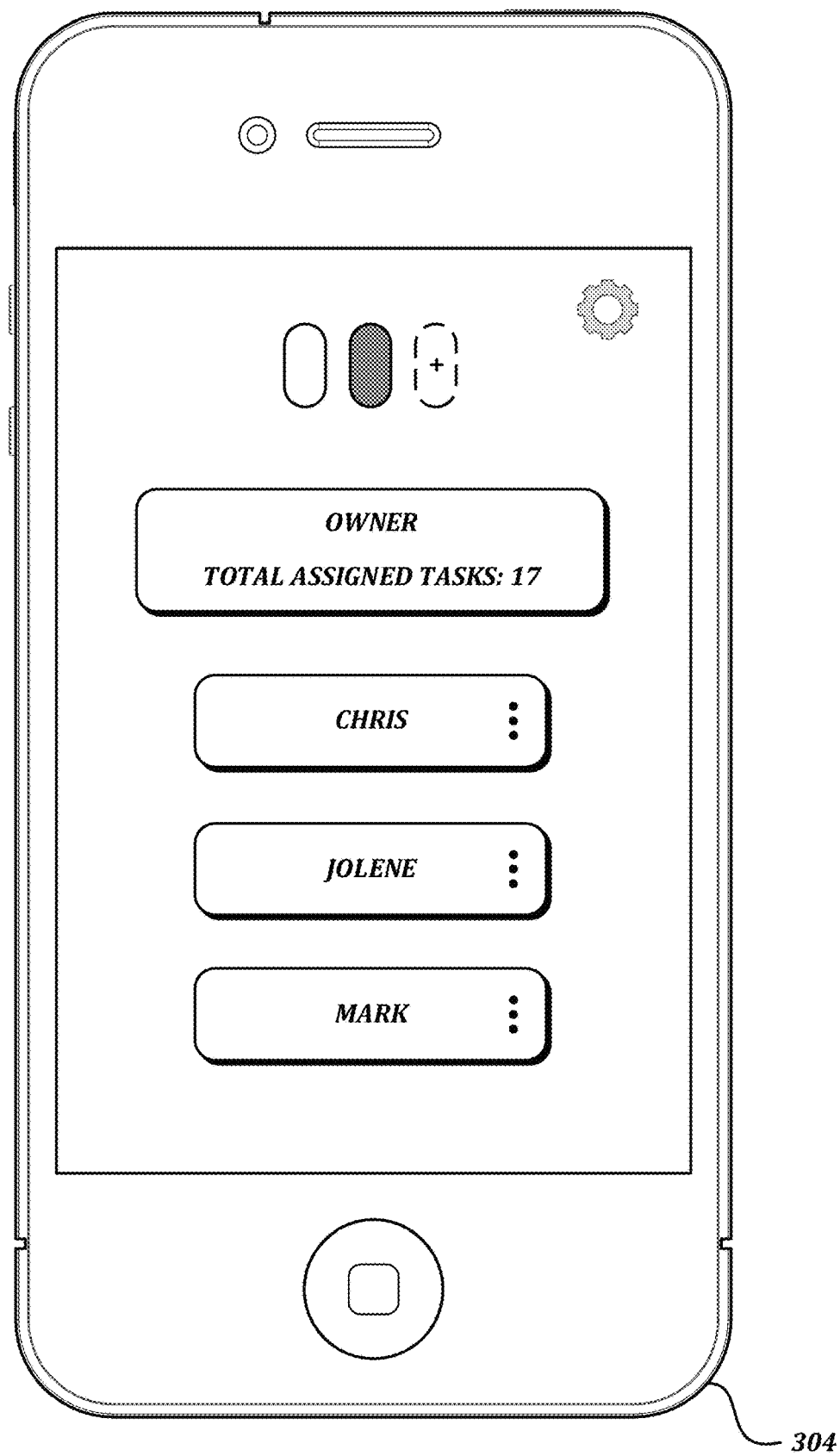
FIG. 8 illustrates an example embodiment of an interface presented by a mobile computing device showing a new first subset of cards and a new calculated value for the tabular data illustrated in FIG. 1 according to various aspects of the present disclosure.

FIG. 8 illustrates an example embodiment of an interface presented by a mobile computing device 304 showing a new first subset of cards and a new calculated value for the tabular data illustrated in FIG. 1 according to various aspects of the present disclosure. As shown, the "title" column was chosen as the new lane identifier column. The new set of lanes includes two lanes based on the values "employee" and "owner" stored in the "title" column. The header card shows that the lane for the value "owner" is being presented, and shows a calculated value of the "sum" calculated value type for the "assigned tasks" column. Because the rows associated with the "Chris," "Jolene," and "Mark" cards have the value "owner" in the "title" column, they are included in the first subset of cards and are presented in the interface.

The method 400 then proceeds to an end block and terminates.

Figure 9:
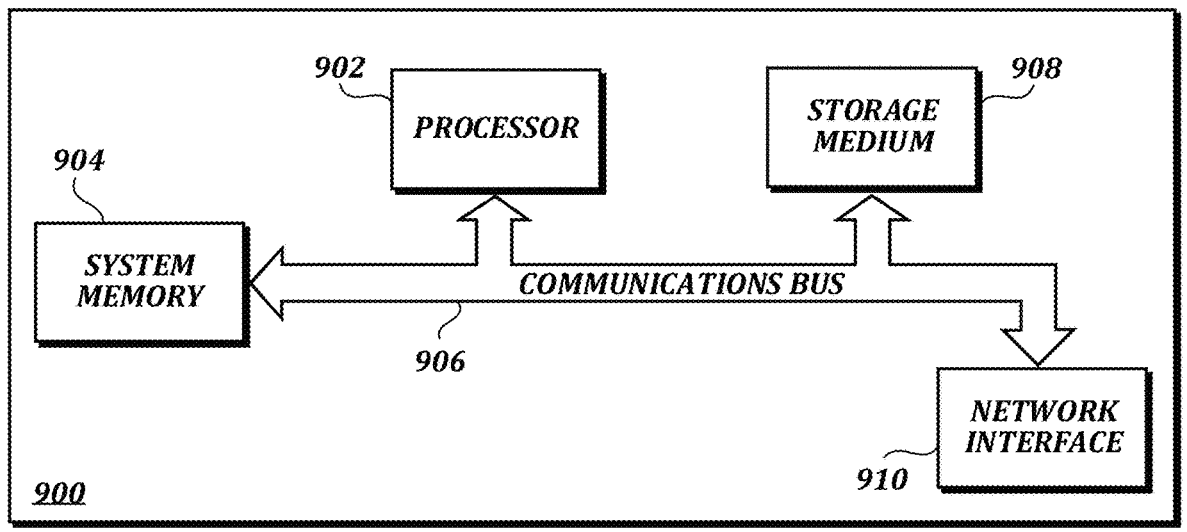
FIG. 9 is a block diagram that illustrates aspects of an exemplary computing device appropriate for use with embodiments of the present disclosure.

FIG. 9 is a block diagram that illustrates aspects of an exemplary computing device 900 appropriate for use with embodiments of the present disclosure. While FIG. 9 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 900 may be any one of any number of currently available or yet to be developed devices.

In its most basic configuration, the computing device 900 includes at least one processor 902 and a system memory 904 connected by a communication bus 906. Depending on the exact configuration and type of device, the system memory 904 may be volatile or nonvolatile memory, such as read only memory ("ROM"), random access memory ("RAM"), EEPROM, flash memory, or similar memory technology. Those of ordinary skill in the art and others will recognize that system memory 904 typically stores data and/or program modules that are immediately accessible to and/or currently being operated on by the processor 902. In this regard, the processor 902 may serve as a computational center of the computing device 900 by supporting the execution of instructions.

As further illustrated in FIG. 9, the computing device 900 may include a network interface 910 comprising one or more components for communicating with other devices over a network. Embodiments of the present disclosure may access basic services that utilize the network interface 910 to perform communications using common network protocols. The network interface 910 may also include a wireless network interface configured to communicate via one or more wireless communication protocols, such as Wi-Fi, 2G, 3G, LTE, WiMAX, Bluetooth, and/or the like.

In the exemplary embodiment depicted in FIG. 9, the computing device 900 also includes a storage medium 908. However, services may be accessed using a computing device that does not include means for persisting data to a local storage medium. Therefore, the storage medium 908 depicted in FIG. 9 is represented with a dashed line to indicate that the storage medium 908 is optional. In any event, the storage medium 908 may be volatile or nonvolatile, removable or nonremovable, implemented using any technology capable of storing information such as, but not limited to, a hard drive, solid state drive, flash memory, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 904 and storage medium 908 depicted in FIG. 9 are merely examples of computer-readable media. Computer-readable media can be used to store data for use by programs. Accordingly, the terms "electronic spreadsheet," "grid," "table," "cell," "spreadsheet data," "sheet data," "column," "row," and others used herein describe display formats and logical inter-relationships for information stored on a computer-readable medium of a computing device 900.

Suitable implementations of computing devices that include a processor 902, system memory 904, communication bus 906, storage medium 908, and network interface 910 are known and commercially available. For ease of illustration and because it is not important for an understanding of the claimed subject matter, FIG. 9 does not show some of the typical components of many computing devices. In this regard, the computing device 900 may include input devices, such as a keyboard, keypad, mouse, microphone, touch input device, touch screen, tablet, and/or the like. Such input devices may be coupled to the computing device 900 by wired or wireless connections including RF, infrared, serial, parallel, Bluetooth, USB, or other suitable connections protocols using wireless or physical connections. Similarly, the computing device 900 may also include output devices such as a display, speakers, printer, etc. Since these devices are well known in the art, they are not illustrated or described further herein.

As will be appreciated by one skilled in the art, the specific routines described above in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used. Further, these FIGURES may graphically represent code to be programmed into a computer-readable storage medium associated with a computing device.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method of displaying, by a mobile computing device, compact summaries of data within a table, wherein the table includes a plurality of rows and a plurality of columns, and wherein the plurality of columns includes a first column and a second column, the method comprising:
   determining a set of lanes representing the data by retrieving a set of values stored in the first column, wherein each lane provides a presentation of a set of cards associated with rows having a given value of the retrieved set of values;
   retrieving a first subset of rows from the plurality of rows that have a first value of the retrieved set of values in the first column, wherein the first value is associated with a first lane of the set of lanes;
   generating a first set of cards based on the retrieved first subset of rows, wherein each card of the first set of cards represents a row of the first subset of rows;
   providing the first set of cards for presentation by a display on the mobile computing device as part of the first lane;
   determining a calculated value for the first lane based on values in the second column for the first subset of rows; and
   providing the calculated value for presentation by the display on the mobile computing device.

2. The method of claim 1, further comprising:
   detecting a move of a card from the first lane to a second lane; and
   determining an updated calculated value for the first lane.

3. The method of claim 1, further comprising:
   providing a set of calculated value types for presentation by the display on the mobile computing device;
   receiving a selection of a calculated value type; and
   determining a new calculated value for the first lane using the selected calculated value type.

4. The method of claim 3, wherein the set of calculated value types includes a sum calculated value type, a mean calculated value type, a median calculated value type, a max calculated value type, and a min calculated value type.

5. The method of claim 1, further comprising:
   providing column identifiers of the plurality of columns for presentation by the display on the mobile computing device;
   receiving a selection of a column identifier associated with a third column; and
   determining a new calculated value for the first lane based on values in the third column for the first subset of rows.

6. The method of claim 1, further comprising:
   providing column identifiers of the plurality of columns for presentation by the display on the mobile computing device;
   receiving a selection of a column identifier associated with a fourth column; and
   determining a new set of lanes representing the data by retrieving a set of values stored in the fourth column.

7. The method of claim 1, wherein the mobile computing device is a smartphone.

8. A computer-readable medium having computer-executable instructions stored thereon that, in response to execution by one or more processors of a computing device, cause the computing device to perform actions for displaying, by a mobile computing device, compact summaries of data within a table, wherein the table includes a plurality of rows and a plurality of columns, and wherein the plurality of columns includes a first column and a second column, the actions comprising:
   determining a set of lanes representing the data by retrieving a set of values stored in the first column, wherein each lane provides a presentation of a set of cards associated with rows having a given value of the retrieved set of values;
   retrieving a first subset of rows from the plurality of rows that have a first value of the retrieved set of values in the first column, wherein the first value is associated with a first lane of the set of lanes;
   generating a first set of cards based on the retrieved first subset of rows, wherein each card of the first set of cards represents a row of the first subset of rows;
   providing the first set of cards for presentation by a display on the mobile computing device as part of the first lane;
   determining a calculated value for the first lane based on values in the second column for the first subset of rows; and
   providing the calculated value for presentation by the display on the mobile computing device.

9. The computer-readable medium of claim 8, wherein the actions further comprise:
   detecting a move of a card from the first lane to a second lane; and
   determining an updated calculated value for the first lane.

10. The computer-readable medium of claim 8, wherein the actions further comprise:
    providing a set of calculated value types for presentation by the display on the mobile computing device;
    receiving a selection of a calculated value type; and
    determining a new calculated value for the first lane using the selected calculated value type.

11. The computer-readable medium of claim 10, wherein the set of calculated value types includes a sum calculated value type, a mean calculated value type, a median calculated value type, a max calculated value type, and a min calculated value type.

12. The computer-readable medium of claim 8, wherein the actions further comprise:
    providing column identifiers of the plurality of columns for presentation by the display on the mobile computing device;
    receiving a selection of a column identifier; and
    determining a new calculated value for the first lane using a column associated with the selected column identifier.

13. The computer-readable medium of claim 8, wherein the actions further comprise:
    providing column identifiers of the plurality of columns for presentation by the display on the mobile computing device;
    receiving a selection of a column identifier; and
    determining a new set of lanes representing the data by retrieving a set of values stored in a column associated with the selected column identifier.

14. The computer-readable medium of claim 8, wherein the mobile computing device is a smartphone.

15. A system comprising one or more computing devices for causing a mobile computing device to display compact summaries of data within a table, wherein the table includes a plurality of rows and a plurality of columns, and wherein the plurality of columns includes a first column and a second column, the one or more computing devices configured to:
- determine a set of lanes representing the data by retrieving a set of values stored in the first column, wherein each lane provides a presentation of a set of cards associated with rows having a given value of the retrieved set of values;
- retrieve a first subset of rows from the plurality of rows that have a first value of the retrieved set of values in the first column, wherein the first value is associated with a first lane of the set of lanes;
- generate a first set of cards based on the retrieved first subset of rows, wherein each card of the first set of cards represents a row of the first subset of rows;
- provide the first set of cards for presentation by a display on the mobile computing device as part of the first lane;
- determine a calculated value for the first lane based on values in the second column for the first subset of rows; and
- provide the calculated value for presentation by the display on the mobile computing device.

16. The system of claim 15, wherein the one or more computing devices are further configured to:
- detect a move of a card from the first lane to a second lane; and
- determine an updated calculated value for the first lane.

17. The system of claim 15, wherein the one or more computing devices are further configured to:
- provide a set of calculated value types for presentation by the display on the mobile computing device;
- receive a selection of a calculated value type; and
- determine a new calculated value for the first lane using the selected calculated value type.

18. The system of claim 17, wherein the set of calculated value types includes a sum calculated value type, a mean calculated value type, a median calculated value type, a max calculated value type, and a min calculated value type.

19. The system of claim 15, wherein the one or more computing devices are further configured to:
- provide column identifiers of the plurality of columns for presentation by the display on the mobile computing device;
- receive a selection of a column identifier; and
- determine a new calculated value for the first lane using a column associated with the selected column identifier.

20. The system of claim 15, wherein the one or more computing devices are further configured to:
- provide column identifiers of the plurality of columns for presentation by the display on the mobile computing device;
- receive a selection of a column identifier; and
- determine a new set of lanes representing the data by retrieving a set of values stored in a column associated with the selected column identifier.

\* \* \* \* \*